(12) United States Patent
Lee et al.

(10) Patent No.: US 9,738,368 B2
(45) Date of Patent: Aug. 22, 2017

(54) FUEL GAS SUPPLY SYSTEM AND METHOD OF SHIP

(71) Applicant: DAEWOO SHIPBUILDING & MARINE ENGINEERING CO., LTD., Seoul (KR)

(72) Inventors: Joon Chae Lee, Daegu (KR); Dong Eok Kang, Geoje-si (KR); Cheong Gi Park, Seoul (KR)

(73) Assignee: DAEWOO SHIPBUILDING & MARINE ENGINEERING CO., LTD., Seoul (KR)

( * ) Notice: Subject to any disclaimer, the term of this patent is extended or adjusted under 35 U.S.C. 154(b) by 20 days.

(21) Appl. No.: 14/421,811

(22) PCT Filed: Nov. 6, 2014

(86) PCT No.: PCT/KR2014/010624
§ 371 (c)(1),
(2) Date: Feb. 13, 2015

(87) PCT Pub. No.: WO2015/105267
PCT Pub. Date: Jul. 16, 2015

(65) Prior Publication Data
US 2016/0096609 A1    Apr. 7, 2016

(30) Foreign Application Priority Data

Jan. 7, 2014  (KR) .................. 10-2014-0001883
Jan. 7, 2014  (KR) .................. 10-2014-0001884
Jan. 7, 2014  (KR) .................. 10-2014-0001885

(51) Int. Cl.
B63B 11/04    (2006.01)
B63H 21/38   (2006.01)
(Continued)

(52) U.S. Cl.
CPC .............. B63H 21/38 (2013.01); B63B 11/04 (2013.01); B63B 17/0036 (2013.01);
(Continued)

(58) Field of Classification Search
CPC .................................. B63H 21/38; B63B 11/04
(Continued)

(56) References Cited

U.S. PATENT DOCUMENTS 5,127,230 A * 7/1992 Neeser ...................... F17C 9/00
                                                                    123/525
5,231,838 A * 8/1993 Cieslukowski ........... F17C 7/02
                                                                    123/525
(Continued)

FOREIGN PATENT DOCUMENTS

CN    101754897 A    6/2010
CN    102666269 A    9/2012
(Continued)

OTHER PUBLICATIONS

Office Action dated Jun. 10, 2016 of corresponding Russian Patent Application No. 2015104988/11 (007843)—5 pages.
(Continued)

Primary Examiner — Lars A Olson
Assistant Examiner — Jovon Hayes
(74) Attorney, Agent, or Firm — Knobbe Martens Olson & Bear LLP

(57) ABSTRACT

Disclosed herein is arrangement of a fuel gas tank in a fuel gas supply system that supplies liquefied natural gas to an engine. In accordance with one aspect of the invention, a fuel gas supply system of a ship includes an engine generating driving force using fuel gas; and a fuel gas tank storing the fuel gas to be supplied to the engine, wherein the engine is disposed in an engine room placed at the stern of the ship and the fuel gas tank is disposed above the engine room.

20 Claims, 3 Drawing Sheets

(51) Int. Cl.
*F02M 21/02* (2006.01)
*B63B 17/00* (2006.01)
*B63H 21/14* (2006.01)

(52) U.S. Cl.
CPC ......... *B63H 21/14* (2013.01); *F02M 21/0221* (2013.01); *F02M 21/0293* (2013.01); *Y02T 10/32* (2013.01); *Y02T 70/5218* (2013.01)

(58) Field of Classification Search
USPC .................................................. 440/88 F, 74
See application file for complete search history.

(56) References Cited

U.S. PATENT DOCUMENTS

| | | | | |
|---|---|---|---|---|
| 5,329,777 | A | * | 7/1994 | Weltmer, Jr. ............. F17C 9/02 62/49.2 |
| 5,687,665 | A | * | 11/1997 | Warkman ................ B63B 11/04 114/74 R |
| 2009/0239426 | A1 | * | 9/2009 | Levander ................ B63B 25/12 440/88 F |
| 2009/0253318 | A1 | | 10/2009 | Hannula et al. |
| 2012/0090527 | A1 | * | 4/2012 | Backlund ................ B63B 27/24 114/74 R |
| 2016/0096609 | A1 | * | 4/2016 | Lee ........................ B63H 21/38 440/88 F |

FOREIGN PATENT DOCUMENTS

| | | |
|---|---|---|
| CN | 103052560 A | 4/2013 |
| CN | 103314208 A | 9/2013 |
| JP | 2008-126829 A | 6/2008 |
| JP | 2012-121401 A | 6/2012 |
| JP | 2013-508203 A | 3/2013 |
| KR | 10-2009-0098387 A | 9/2009 |
| KR | 10-0961867 B1 | 6/2010 |
| KR | 10-2011-0046947 A | 5/2011 |
| KR | 10-2012-0084973 A | 7/2012 |
| KR | 10-2012-0125129 A | 11/2012 |
| KR | 10-2012-0133360 A | 12/2012 |
| KR | 10-2013-0073066 A | 7/2013 |
| RU | 2481234 C1 | 5/2013 |
| WO | 2012/089891 A1 | 7/2012 |

OTHER PUBLICATIONS

Office Action dated Mar. 29, 2016 of corresponding Japanese Patent Application No. 2015-556895—3 pages.
Office Action dated Jun. 13, 2016 of corresponding Chinese Patent Application No. 201480002133.0—11 pages.
Office Action dated Jan. 13, 2015 of corresponding Korean Patent Application No. 10-2014-0001883—5 pages.
Korean Office Action dated Feb. 10, 2015 of corresponding Korean Patent Application No. 10-2014-0001885—7 pages.
Extended European Search Report and Written Opinion dated May 16, 2017 of corresponding European Patent Application No. EP 14835468—10 pages.
Schiff & Hafen, "LNG-Motorenkonzept für Containerschiff", Nov. 2010, No. 11, p. 56 and its English translation in 2 pages.

* cited by examiner

FUEL GAS SUPPLY SYSTEM AND METHOD OF SHIP

TECHNICAL FIELD

The present invention relates to a fuel gas supply system and method of a ship, and more particularly, to arrangement of a bunkering manifold, a vent riser, a fuel gas supply (FGS) room and a fuel gas tank in a fuel gas supply system which supplies liquefied natural gas to a ship engine.

BACKGROUND ART

In recent years, with increasing interest in environmental pollution due to various toxic materials contained in exhaust gas generated upon combustion of heavy oil, marine diesel oil (MDO), and the like used as fuel for various ship engines, regulation has been intensified with regard to ship engines using heavy oil and the like as fuel, thereby causing increase in costs to comply with such regulations.

Accordingly, development of ships using clean gas fuel such as LNG, LPG, CNG or DME has been suggested and achieved in addition to the prevention or minimization of use of fuel oil such as heavy oil or MDO.

Particularly, an M-type electronically controlled gas injection (MEGI) engine uses liquefied natural gas as fuel, and includes a high pressure pump and a high pressure evaporator in order to achieve a required high pressure gas supply (200-300 bar).

Fuel gas is generally stored in a liquid state in a fuel gas tank at low temperature. The fuel gas tank has a larger size and a heavier weight than diesel oil tanks. In order to supply fuel gas from the fuel gas tank to an engine, a high pressure pump and a high pressure evaporator are required. These devices are disposed in a fuel gas supply (FGS) room. Thus, it is an important issue to determine suitable locations of the fuel gas tank and the FGS room in a ship in order to achieve efficient use of a space in the ship.

In addition, the ship is provided with a bunkering manifold which receives fuel gas, and a vent riser which acts as a vent hole through which boil-off gas (BOG) is discharged from the fuel gas tank and the FGS room in an emergency. Since the bunkering manifold acts as a device for receiving the fuel gas, and the vent riser discharges BOG, both devices are exposed to a risk of explosion. Therefore, it is important to determine suitable locations of the bunkering manifold and the vent riser within the ship in order to facilitate supply of fuel gas while reducing the risk of explosion.

DISCLOSURE

Technical Problem

Embodiments of the invention provide a fuel gas supply system and method of a ship, in which a fuel gas tank and a fuel gas supply (FGS) room are disposed to allow efficient use of a space in the ship while minimizing a length of a fuel gas supply line, and in which a bunkering manifold and a vent riser are disposed to facilitate supply of fuel gas while reducing a risk of explosion.

Technical Solution

In accordance with one aspect of the present invention, a fuel gas supply system of a ship includes: an engine generating driving force using fuel gas; and a fuel gas tank storing the fuel gas to be supplied to the engine, wherein the engine is disposed in an engine room placed at the stern of the ship and the fuel gas tank is disposed above the engine room.

Particularly, the fuel gas tank may be disposed in a longitudinal direction of the ship.

In addition, the ship may be a container ship.

Further, the fuel gas tank may be disposed on a first deck and a second deck may be disposed above the fuel gas tank to allow a container to be loaded on the second deck.

Further, the fuel gas supply system may further include a fuel gas supply (FGS) room, which includes machinery for supplying the fuel gas to the engine after pressurizing the fuel gas stored in the fuel gas tank.

Further, the fuel gas supply room may include: a fuel gas supply line transferring the fuel gas stored in the fuel gas tank to the engine; a high pressure pump pressurizing the fuel gas stored in the fuel gas tank; and a heater heating the pressurized fuel gas.

Further, the fuel gas supply room may be disposed above the engine room.

In accordance with another aspect of the invention, a fuel gas supply method of a ship includes: pressurizing fuel gas stored in a fuel gas tank so as to satisfy requirements of an engine; and heating the pressurized fuel gas and supplying the heated fuel gas to the engine, wherein the engine is disposed in an engine room placed at the stern of the ship and the fuel gas tank is disposed above the engine room.

Particularly, the fuel gas tank may be disposed in a longitudinal direction of the ship.

In addition, the ship may be a container ship.

Further, the fuel gas tank may be disposed on a first deck and a second deck may be disposed above the fuel gas tank to allow a container to be loaded on the second deck.

In accordance with a further aspect of the invention, a fuel gas supply system of a ship includes: an engine generating driving force using fuel gas; a first fuel gas tank storing fuel gas to be supplied to the engine; and a fuel gas supply (FGS) room including machinery for pressurizing the fuel gas stored in the fuel gas tank and supplying the pressurized fuel gas to the engine, wherein the engine is disposed in an engine room placed at the stern of the ship and the fuel gas tank is disposed above the engine room.

Particularly, the fuel gas supply room may be disposed near the first fuel gas tank.

In addition, the fuel gas supply system may further include: a second fuel gas tank storing fuel tank to be supplied to the engine, wherein the fuel gas supply room may be disposed between the first fuel gas tank and the second fuel gas tank.

Further, the fuel gas supply room may include a fuel gas supply line transferring the fuel gas stored in the fuel gas tank to the engine; a high pressure pump pressurizing the fuel gas stored in the fuel gas tank; and a heater heating the pressurized fuel gas.

In addition, the ship may be a container ship.

Further, the fuel gas tank may be disposed above the engine room.

In accordance with yet another aspect of the invention, a fuel gas supply method of a ship includes: pressurizing fuel gas stored in a fuel gas tank using a high pressure pump so as to satisfy requirements of an engine; and heating the pressurized fuel gas using a heater and supplying the heated fuel gas to the engine, wherein the engine is disposed in an engine room placed at the stern of the ship, and a fuel gas supply room including the high pressure pump and the heater is disposed above the engine room.

Particularly, the fuel gas supply room may be placed near the fuel gas tank.

In addition, the ship may be a container ship.

In accordance with yet another aspect of the invention, a fuel gas supply system of a ship includes: an engine generating driving force using fuel gas; a fuel gas tank storing fuel gas to be supplied to the engine; and a bunkering manifold receiving fuel gas supplied from an outside of the ship and supplying the fuel gas to the fuel gas tank, wherein the engine is disposed in an engine room placed at the stern of the ship, and the bunkering manifold is disposed at one side of the stern of the ship.

Particularly, the bunkering manifold may be disposed at a side of the fuel gas tank.

In addition, the fuel gas supply system may further include a vent riser discharging boil-off gas (BOG) of the fuel gas tank in an emergency.

Further, the vent riser may be disposed at the stern of the ship.

Further, the bunkering manifold and the vent riser may be disposed at opposite sides of the ship, respectively.

Further, the bunkering manifold may receive fuel gas supplied from an LNG bunkering ship.

Further, the ship may be a container ship.

In accordance with yet another aspect of the invention, a fuel gas supply system of a ship includes: an engine generating drive force using fuel gas; a fuel gas tank storing fuel gas to be supplied to the engine; and a vent riser discharging boil-off gas (BOG) of the fuel gas tank in an emergency, wherein the engine is disposed in an engine room placed at the stem of the ship and the vent riser is disposed at one side of the stem of the ship.

Particularly, the fuel gas supply system may further include a fuel gas supply (FGS) room including machinery for pressurizing the fuel gas stored in the fuel gas tank and supplying the pressurized fuel gas to the engine.

Further, the vent riser may discharge boil-off gas from the fuel gas supply room.

Further, the ship may be a container ship.

Advantageous Effects

According to embodiments of the invention, a bunkering manifold is disposed at one side of the stern to facilitate supply of fuel gas.

In addition, a vent riser is disposed at the stem of a ship to prevent fuel gas from approaching an accommodation unit or non-hazardous cargo such as a cooling container.

Further, the bunkering manifold and the vent riser may be respectively disposed at opposite sides of the ship, thereby reducing explosion due to fuel gas.

According to the embodiments, an FGS room and a fuel gas tank are disposed above the engine room to achieve efficient use of a space in the ship while minimizing a length of a fuel gas supply line. Further, the fuel gas tank is disposed in the longitudinal direction of the ship to minimize a sloshing phenomenon.

Further, the bunkering manifold is disposed at one side of the stern to facilitate supply of fuel gas. Furthermore, the vent riser is disposed at the stern of the ship to prevent the fuel gas from approaching an accommodation unit or non-hazardous cargo such as a cooling container. Furthermore, the bunkering manifold and the vent riser may be respectively disposed at opposite sides of the ship, thereby reducing explosion due to the fuel gas.

EMBODIMENTS

Figure 1:
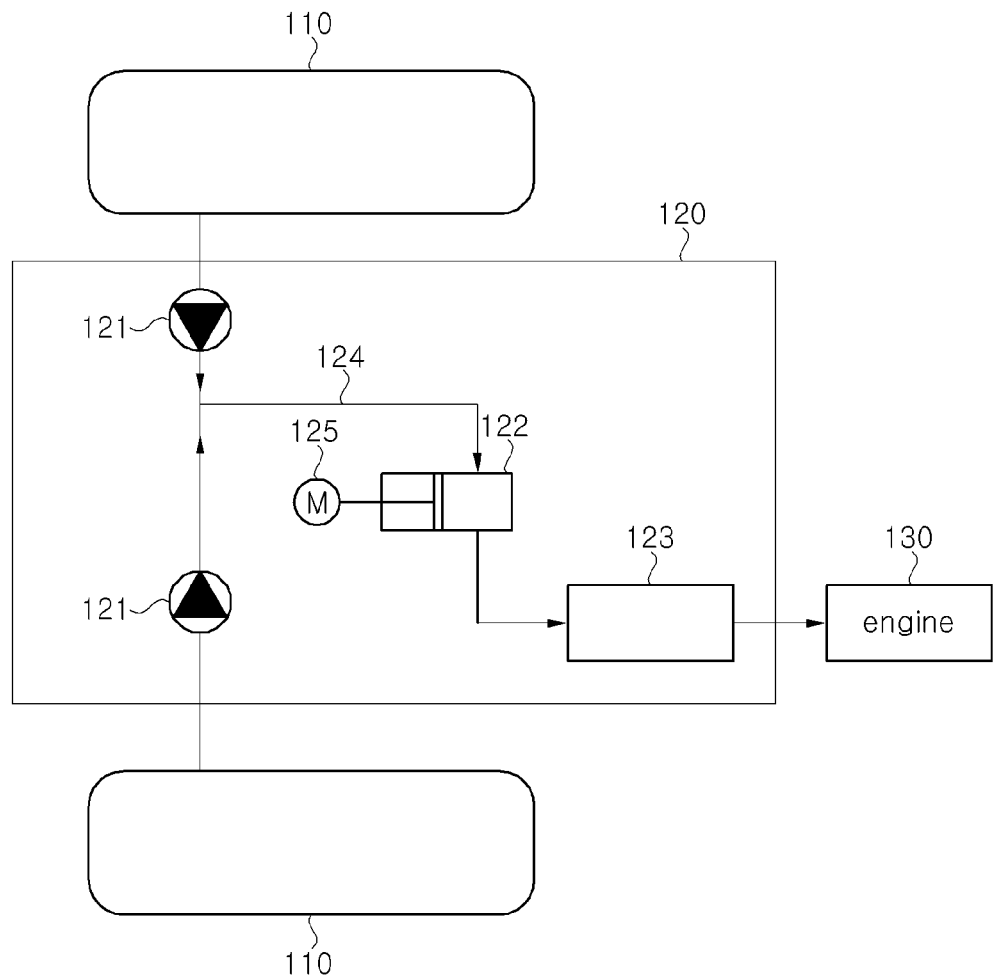
FIG. 1 is a diagram of a fuel gas supply system of a ship according to one embodiment of the present invention.

Embodiments of the present invention will now be described in detail with reference to the accompanying drawings. It should be noted that like components are denoted by like reference numerals throughout the specification and the accompanying drawings. In addition, descriptions of functions or features irrelevant to the present invention will be omitted for clarity.

The International Maritime Organization regulates emission of nitrogen oxides ($NO_x$) and sulfur oxides ($SO_x$) among exhaust gas of ships, and plans additional regulation on carbon dioxide ($CO_2$) in recent years. Particularly, compulsory fulfillment of the regulations on emission of nitrogen oxides ($NO_x$) and sulfur oxides ($SO_x$) took effect in May 2005 after a long duration of eight years from suggestion of the regulations by the protocol of the Prevention of Marine Pollution from Ships in 1997.

Accordingly, various methods for reducing emission of nitrogen oxides ($NO_x$) have been suggested in order to satisfy such regulations. Among these methods, a high pressure natural gas injection engine, for example, an MEGI engine, for marine structures including ships such as LNG carriers has been developed and used in the related art. The MEGI engine can reduce emission of pollutants, that is, carbon dioxide up to 23%, nitrogen compounds up to 80%, and sulfur compounds up to 95% or more, as compared with the same output level of diesel engines, and is spotlighted as an environmentally friendly next generation engine.

Such an MEGI engine employs natural gas as fuel of the engine and requires a high pressure of about 200 to 400 bara (absolute pressure) according to load for fuel gas supply to the engine.

The MEGI engine may be directly connected to a propeller for propulsion and is thus composed of a two-stroke engine which rotates at low speed. That is, the MEGI engine is a low speed two-stroke high pressure natural gas injection engine.

Figure 2:
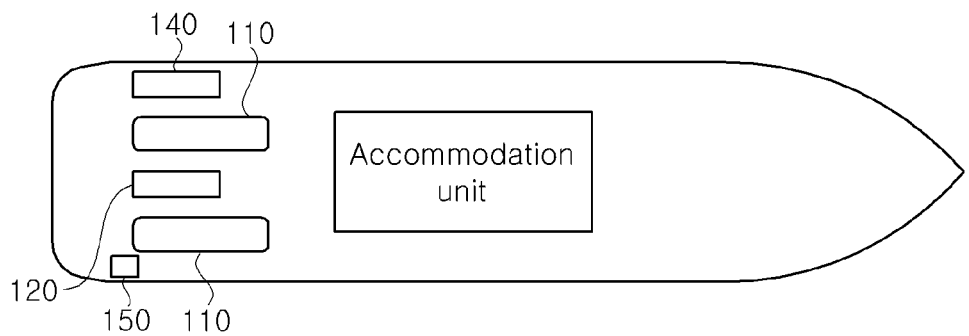
FIG. 2 is a plan view of the fuel gas supply system of a ship according to the embodiment of the present invention.
Figure 3:
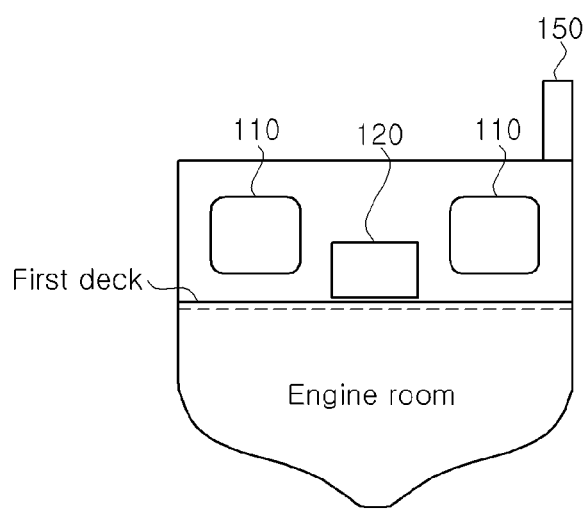
FIG. 3 is a sectional view of arrangement of the fuel gas supply system of a ship according to the embodiment of the present invention.
Figure 4:
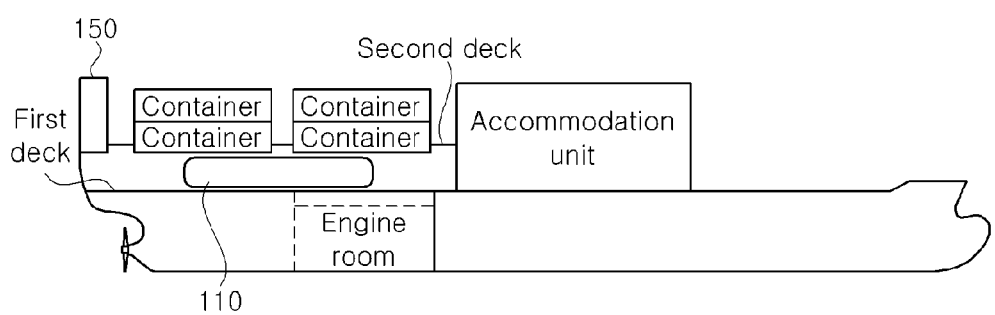
FIG. 4 is a side view of the fuel gas supply system of a ship according to the embodiment of the present invention.
Figure 5:
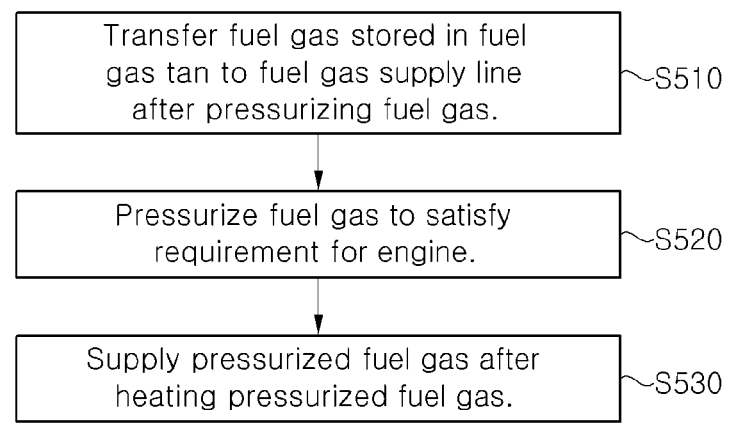
FIG. 5 is a flow diagram of a fuel gas supply method of a ship according to one embodiment of the present invention.

FIG. 1 is a diagram of a fuel gas supply system of a ship according to one embodiment of the present invention, FIG. 2 is a plan view of the fuel gas supply system of a ship according to the embodiment of the present invention, FIG. 3 is a sectional view of arrangement of the fuel gas supply system of a ship according to the embodiment of the present invention, FIG. 4 is a side view of the fuel gas supply system of a ship according to the embodiment of the present invention, and FIG. 5 is a flow diagram of a fuel gas supply method of a ship according to one embodiment of the present invention.

Referring to FIGS. 1 to 4, a fuel gas supply system of a ship according to one embodiment of the invention includes a fuel gas tank 110, a fuel gas supply (FGS) room 120, an engine 130, a bunkering manifold 140 and a vent riser 150, and the engine 130 is placed in an engine room.

The fuel gas tank 110 stores fuel gas to be supplied to the engine 130, and machinery in the FGS room 120 pressurizes the fuel gas in fuel gas tank 110 to supply the pressurized fuel gas to the engine 130.

The engine 130 is a gas-powered engine that generates drive force using the fuel gas supplied from the fuel gas tank 110. The engine 130 may be an MEGI engine or a heterogeneous fuel engine.

When the engine 130 is a heterogeneous fuel engine, the engine 130 may selectively receive LNG or oil. However, in order to prevent deterioration in efficiency of the engine 130, the fuel gas supply system may prevent supply of a mixture of LNG and oil.

In the engine 130, as a piston is reciprocated within a cylinder by combustion of the fuel gas, a crankshaft connected to the piston is rotated to allow rotation of a shaft connected to the crankshaft. Thus, as a propeller connected to the shaft is finally rotated upon driving of the engine 130, the hull moves forwards or rearwards.

Although the engine 130 will be illustrated as an engine for driving the propeller in this embodiment, it should be understood that the engine 130 may be an engine for generation of electric power or other types of power. That is, the engine 130 according to this embodiment is not limited to a certain kind of engine. The engine 130 may be an internal combustion engine that generates drive force through combustion of LNG.

The engine 130 is disposed in the engine room. Here, as shown in FIG. 4, the engine room is placed at the stern of the ship.

The fuel gas tank 110 stores fuel gas to be supplied to the engine 130. The fuel gas tank 110 generally stores the fuel gas in a liquid state. In this regard, since natural gas is liquefied at a cryogenic temperature of about −163° C. under normal pressure, the natural gas is likely to evaporate at a temperature even slightly higher than −163° C. under normal pressure. Even in the case where the fuel gas tank 110 is in an insulated state, since external heat is continuously supplied to the natural gas, the natural gas is continuously evaporated within the fuel gas tank to generate boil-off gas (BOG) within the fuel gas tank 110, whereby an internal pressure of the fuel gas tank 110 can be increased. Accordingly, the fuel gas tank 110 may take the form of a pressure tank. Even when the fuel gas tank 110 takes the form of the pressure tank, it is necessary to discharge BOG from the fuel gas tank 110 in order to prevent continuous increase of the pressure in the fuel gas tank 110. BOG may be used as fuel in the ship or may be liquefied and transferred again to the fuel gas tank 110.

As shown in FIGS. 2 to 4, the fuel gas tank 110 is placed above the engine room. This arrangement enables efficient use of a space in the ship while minimizing a length of a fuel gas supply line 124 extending from the fuel gas tank 110 to the engine room. That is, the fuel gas tank 110 is placed behind an accommodation unit. As shown in FIGS. 3 and 4, a first deck may be disposed above the engine room, and the fuel gas tank 110 may be disposed on the first deck. Here, the first deck may be a main deck.

Particularly, in a container ship, a cargo hold for loading containers is generally placed in front of the engine room. However, since the containers are loaded from above, the container cannot be loaded below the fuel gas tank 110. Accordingly, in the structure where the fuel gas tank 110 is placed above the cargo hold instead of the engine room, the containers cannot be loaded on the cargo hole below the fuel gas tank 110, so that a cargo amount to be loaded on the ship is decreased, thereby causing loss. Accordingly, the arrangement of the fuel gas tank 110 disposed above the engine room enables efficient use of the space in the ship.

In addition, as shown in FIG. 2, the fuel gas tank 110 may be disposed in a longitudinal direction of the ship. This arrangement minimizes a sloshing phenomenon. Sloshing refers to relative movement between a fluid and a container containing the fluid. Thus, in transportation of fluid cargo, the sloshing phenomenon is generated within a transport container, generating impact, by which the transport container can be damaged. That is, fuel gas rolls within the fuel gas tank 110 due to rolling movement of the ship, whereby the fuel gas tank 110 can be damaged. Thus, the arrangement of the fuel gas tank 110 disposed in the longitudinal direction of the ship reduces force applied to the fuel gas tank 110 by rolling of the fuel gas due to rolling of the ship, thereby preventing damage to the fuel gas tank 110.

Further, as shown in FIG. 4, a second deck may be additionally disposed above the fuel gas tank 110 to load a container thereon.

In FIGS. 1 to 3, two fuel gas tanks 110 are disposed on the ship. However, it should be noted that the fuel gas supply system according to the invention may include a single fuel gas tank 110 or a plurality of fuel gas tanks 110 for failsafe redundancy.

As shown in FIG. 1, the FGS room 120 includes the fuel gas supply line 124, a primary pump 121, a secondary pump 122, and a heater 123.

The fuel gas supply line 124 is a pipe for transferring the fuel gas from the fuel gas tank 110 to the engine 130. As shown in FIG. 1, the fuel gas supply line 124 is provided with the primary pump 121, the secondary pump 122 and the heater 123 to supply the fuel gas to the engine 130 after changing the pressure and temperature of the fuel gas to a desired pressure and temperature for the engine 130.

The fuel gas supply line 124 may be provided with a fuel supply valve to adjust a supply amount of fuel gas through adjustment of a degree of opening the fuel supply valve.

The primary pump 121 transfers the fuel gas stored in the fuel gas tank 110 to the fuel gas supply line 124 after pressurizing the fuel gas to several to dozen bar. As shown in FIG. 1, a single primary pump 121 is connected to each of the fuel gas tanks 110 and transfers the fuel gas stored in the corresponding fuel gas tank 110 to the fuel gas supply line 124. The fuel gas supply lines 124 are combined before the secondary pump 122.

In FIG. 1, two primary pumps 121, a single secondary pump 122 and a single heater 123 are shown. However, it should be understood that the fuel gas supply system according to the present invention may include certain numbers of primary pumps 121, secondary pumps 122 and heaters 123.

Although the primary pump 121 is illustrated as being disposed outside the fuel gas tank 110 in FIG. 1, the primary pump 121 may be disposed inside the fuel gas tank 110.

The secondary pump 122 is a high pressure pump and pressurizes the fuel gas to a pressure required for the engine 130, for example, to a pressure of 200 to 400 bar. The secondary pump 122 may be driven by a motor 125.

The heater 123 supplies the fuel gas to the engine after heating the fuel gas pressurized by the secondary pump 122 to a temperature required for the engine 130.

As shown in FIGS. 2 and 3, the FGS room 120 is disposed above the engine room. This arrangement enables efficient use of the space in the ship and minimizes the length of the fuel gas supply line 124 extending from the FGS room 120 to the engine room. As shown in FIGS. 3 and 4, the first deck is disposed above the engine room, and the FGS room may be disposed above the first deck.

In addition, the FGS room 120 may be placed near the fuel gas tank 110. The arrangement can minimize the length of the fuel gas supply line 124 connecting the fuel gas tank 110 and the FGS room 120.

Further, as shown in FIGS. 2 and 3, when the fuel gas supply system includes two fuel gas tanks 110, the FGS room 120 may be disposed between the two fuel gas tanks 110. This structure can minimize the length of the fuel gas supply line 124 connecting the fuel gas tank 110 to the FGS room 120.

Referring to FIGS. 2 and 3, the bunkering manifold 140 is an apparatus for receiving the fuel gas. That is, the ship receives the fuel gas supplied from an external reservoir, for example, an LNG bunkering ship, and stores the fuel gas in the fuel gas tank 110. Here, the device for receiving the fuel gas supplied from the external reservoir is the bunkering manifold 140. The bunkering manifold 140 is connected to the fuel gas tank 110 and a fuel gas transfer line, and supplies the fuel gas to the fuel gas tank 110 through the fuel gas transfer line.

As shown in FIGS. 2 and 3, the bunkering manifold 140 is disposed at one side of the stern in order to facilitate supply of the fuel gas. Alternatively, the bunkering manifold 140 may be disposed at one side of the fuel gas tank 110 to secure convenient transfer of the fuel gas to the fuel gas tank 110.

The vent riser 150 is a discharge port through which BOG of the fuel gas tank 110 and the FGS room 120 is discharged in an emergency. The vent riser 150 is connected to the fuel gas tank 110 and the FGS room 140 by a BOG transfer line. As described above, the fuel gas stored in a liquid state in the fuel gas tank 110 is evaporated by heat introduced from the outside into the fuel gas tank 110 to generate BOG. BOG may be used as fuel within the ship or may be liquefied and transferred again to the fuel gas tank 110. However, in the event where BOG is not discharged from the fuel gas tank 110 or an excess of BOG is generated therein due to failure of this system, inner pressure of the fuel gas tank 110 can be increased. In such an emergency circumstance, the vent riser 150 discharges BOG of the fuel gas tank 110. In addition, the vent riser 150 may also discharge BOG of the FGS room 140 in an emergency.

The vent riser 150 is disposed at the stern of the ship to prevent the fuel gas from approaching an accommodation unit or non-hazardous cargo such as a cooling container. Further, the bunkering manifold 140 and the vent riser 150 may be respectively disposed at opposite sides of the ship, thereby reducing explosion due to the fuel gas. For example, the bunkering manifold 140 may be disposed at the portside of the ship and the vent riser 150 may be disposed at the starboard of the ship. Alternatively, the bunkering manifold 140 may be disposed on the starboard of the ship and the vent riser 150 may be disposed on the portside of the ship. The arrangement wherein the bunkering manifold 140 and the vent riser 150 are disposed at opposite sides reduces a risk of explosion by the fuel gas.

Next, a fuel gas supply method of a ship will be described with reference to FIG. 5. FIG. 5 is a flow diagram of a fuel gas supply method of a ship according to one embodiment of the present invention.

Referring to FIG. 5, a primary pump 121 pressurizes fuel gas stored in a fuel gas tank 110 and transfers the fuel gas to a fuel gas supply line 124 (S510). In addition, a secondary pump 122 pressurizes the fuel gas to a pressure required for an engine 130, for example, to a pressure of 200 to 400 bar (S520). Further, a heater 123 supplies the fuel gas to the engine after heating the fuel gas pressurized by the secondary pump 122 to a temperature required for the engine 130 (S530).

Here, the fuel gas tank 110 is disposed above an engine room to enable efficient use of a space in the ship while minimizing a length of the fuel gas supply line 124 extending from the fuel gas tank 110 to the engine room. Further, as shown in FIG. 2, the fuel gas tank 110 may be disposed in a longitudinal direction of the ship to minimize a sloshing phenomenon. Further, as shown in FIG. 4, a second deck may be additionally disposed above the fuel gas tank 110 to allow a container to be loaded thereon.

Further, a FGS room 120 including a primary pump 121, a secondary pump 122 and a heater 123 is disposed above the engine room to enable efficient use of the space in the ship while minimizing the length of the fuel gas supply line 124 extending from the FGS room 120 to the engine room. Further, the FGS room 120 may be disposed near the fuel gas tank 110 to minimize the length of the fuel gas supply line 124 extending from the fuel gas tank 110 to the FGS room 120.

Although some embodiments have been described herein, it should be understood by those skilled in the art that these embodiments are given by way of illustration only, and that various modifications, variations and alterations can be made without departing from the spirit and scope of the invention. Therefore, the embodiments disclosed herein should not be construed as limiting the technical scope of the present invention, but should be construed as illustrating the idea of the present invention. The scope of the present invention should be interpreted according to the appended claims as covering all modifications or variations derived from the appended claims and equivalents thereof.

The invention claimed is:

1. A container ship, comprising:
    an engine configured for generating driving force using fuel gas;
    at least one fuel gas tank storing the fuel gas to be supplied to the engine, wherein the engine is disposed in an engine room, wherein in a vertical cross-section taken by a plane extending between the container ship's bow and stern, the at least one fuel gas tank is at a level higher than the engine room and at least in part overlaps with the engine room when viewed in a vertical direction parallel to the plane; and
    a cargo hold configured for loading at least one cargo container at a level higher than the at least one fuel gas tank such that the at least one cargo container is placed over the at least one fuel as tank and at least in part overlaps with the at least one fuel gas tank when viewed in the vertical direction, wherein the at least one cargo container is to contain cargo other than the fuel gas.

2. The container ship according to claim 1, wherein the at least one fuel gas tank comprises an elongated configuration with a longitudinal axis generally parallel to the plane.

3. The container ship according to claim 1, further comprising:
    a fuel gas supply (FGS) room including machinery configured for pressuring and sending the fuel gas to the engine.

4. The container ship according to claim 3, wherein the FGS room comprises:
    a fuel gas supply line configured for receiving the fuel gas from the at least one fuel gas tank;
    a high pressure pump configured for pressurizing the fuel gas; and
    a heater configured for heating the pressurized fuel gas.

5. A container ship, comprising:
an engine configured for generating driving force using fuel gas;
a first fuel gas tank storing fuel gas to be supplied to the engine; and
a fuel gas supply (FGS) room enclosing at least one pump configured for pressurizing the fuel gas from the first fuel gas tank and sending the pressurized fuel gas to the engine, wherein the engine is disposed in an engine room other than the FGS room, wherein the FGS room is located at a level above the engine room, and the first fuel gas tank is disposed at a level higher than the engine room.

6. The container ship according to claim 5, wherein the first fuel gas tank is disposed at a level higher than the FGS room.

7. The container ship according to claim 5, further comprising:
a second fuel gas tank storing fuel gas to be supplied to the engine,
wherein in a vertical cross-section taken by a plane extending between a starboard and a port of the ship, the FGS room is disposed between the first fuel gas tank and the second fuel gas tank along a horizontal line parallel to the plane.

8. The container ship according to claim 5, wherein the FGS room further comprises:
a fuel gas supply line configured for receiving the fuel gas from the first fuel gas tank; and
a heater configured for heating the fuel gas.

9. A fuel gas supply system of a ship, comprising:
an engine configured for generating driving force using fuel gas;
at least one fuel gas tank storing fuel gas to be supplied to the engine; and
a bunkering manifold configured for receiving fuel gas supplied from outside of the ship and supplying the fuel gas to the at least one fuel gas tank,
wherein the engine is disposed in an engine room placed in a rear portion of the ship and the bunkering manifold is disposed at one side of a stern of the ship.

10. The fuel gas supply system of a ship according to claim 9, wherein the bunkering manifold is disposed between the at least one fuel gas tank a port of the ship.

11. The fuel gas supply system of a ship according to claim 9, further comprising:
a vent riser configured for discharging boil-off gas (BOG) of the fuel gas tank in an emergency.

12. The fuel gas supply system of a ship according to claim 11, wherein the vent riser is disposed at one side of the stern of the ship.

13. The fuel gas supply system of a ship according to claim 12, wherein the bunkering manifold and the vent riser are disposed at opposite sides of the ship.

14. The fuel gas supply system of a ship according to claim 9, wherein the bunkering manifold is configured to receive fuel gas supplied from an LNG bunkering ship.

15. The fuel gas supply system of a ship according to claim 9, wherein the ship is a container ship.

16. The fuel gas supply system of a ship according to claim 9, wherein the bunkering manifold is disposed between the at least one fuel gas tank and a starboard of the ship.

17. The fuel gas supply system of a ship according to claim 9, wherein a first distance between the bunkering manifold and a starboard of the ship is less than a second distance between the bunkering manifold and a port of the ship.

18. The fuel gas supply system of a ship according to claim 9, wherein a first distance between the bunkering manifold and a port of the ship is less than a second distance between the bunkering manifold and a starboard of the ship.

19. The fuel gas supply system of a ship according to claim 13, wherein the bunkering manifold is closer to a port of the ship than the vent riser, and wherein the vent riser is closer to a starboard of the ship than the bunkering manifold.

20. The fuel gas supply system of a ship according to claim 13, wherein the bunkering manifold is closer to a starboard of the ship than the vent riser, and wherein the vent riser is closer to a port of the ship than the bunkering manifold.

* * * * *